US008071918B2

(12) United States Patent
Veltrop et al.

(10) Patent No.: US 8,071,918 B2
(45) Date of Patent: Dec. 6, 2011

(54) CONTROLLER FOR A FOOD HOLDING OVEN

(75) Inventors: Loren Veltrop, Chicago, IL (US); Jeff Schroeder, Lake Zurich, IL (US); Richard L. Thorne, Elgin, IL (US)

(73) Assignee: Prince Castle LLC., Carol Stream, IL (US)

( * ) Notice: Subject to any disclaimer, the term of this patent is extended or adjusted under 35 U.S.C. 154(b) by 1071 days.

(21) Appl. No.: 11/928,348

(22) Filed: Oct. 30, 2007

(65) Prior Publication Data

US 2009/0114636 A1 May 7, 2009

(51) Int. Cl.
*A47J 36/24* (2006.01)
*F27D 11/02* (2006.01)
*H05B 1/02* (2006.01)

(52) U.S. Cl. ........ 219/411; 219/385; 219/412; 219/492; 99/332; 99/483

(58) Field of Classification Search ........................ None
See application file for complete search history.

(56) References Cited

U.S. PATENT DOCUMENTS

| | | | | |
|---|---|---|---|---|
| 3,313,917 | A * | 4/1967 | Ditzler et al. | 219/400 |
| 4,401,884 | A * | 8/1983 | Kusunoki et al. | 219/492 |
| 4,740,888 | A | 4/1988 | Ceste, Sr. et al. | |
| 5,454,427 | A * | 10/1995 | Westbrooks et al. | 165/267 |
| 5,947,012 | A * | 9/1999 | Ewald et al. | 99/374 |
| 6,175,099 | B1 * | 1/2001 | Shei et al. | 219/399 |
| 6,315,039 | B1 * | 11/2001 | Westbrooks et al. | 165/201 |
| 6,384,381 | B2 * | 5/2002 | Witt et al. | 219/411 |
| 7,105,779 | B2 * | 9/2006 | Shei | 219/413 |
| 7,166,821 | B2 * | 1/2007 | Adamski | 219/400 |
| 7,227,102 | B2 * | 6/2007 | Shei | 219/394 |
| 7,328,654 | B2 * | 2/2008 | Shei | 99/468 |
| 7,446,282 | B2 * | 11/2008 | Shei et al. | 219/391 |
| 7,755,006 | B2 * | 7/2010 | Jones et al. | 219/412 |
| 7,765,918 | B2 * | 8/2010 | Garniss et al. | 99/330 |
| 2008/0029503 | A1 * | 2/2008 | Cavada et al. | 219/411 |

* cited by examiner

*Primary Examiner* — Joseph M Pelham
(74) *Attorney, Agent, or Firm* — Kelly & Krause, LP; Joseph P. Krause

(57) ABSTRACT

A controller for a food holding oven determines one or more time periods during each of which heat is directed at a pre-cooked food item. By controlling the heat intensity and the time over which different amounts of heat are provided to different types of pre-cooked food items, the time during which a particular type of pre-cooked food item can be kept palatable is maximized.

20 Claims, 10 Drawing Sheets

$P_{out}$ Vs. Time

```
/* line reference */

  /* 200VAC -> 500 A/D, 260VAC -> 680 A/D */
  /* 180 A/D counts delta */
  iivar = runAD(LSENSEAD);

  /* a/d result (705-945) */
  /* normalize (100-130) */

  /* average */
  linerefavg += iivar;
  linerefavg >>= 1;

  linerefa2d = linerefavg;

  if(linerefa2d >= BASEPWRCOMP)
    linerefa2d -= BASEPWRCOMP;
  else
    linerefa2d = 0;

  /* calculate linepwrmult */
  iivar = linerefa2d * LINEMULT;
  iivar /= LINESLOPE;
  iivar += LINEOFFSET;

/* this is the calculated modifier for heater settings  (linepwrmult) */

  linepwrmult = (uchar)(iivar / 10);

       for(ii=0;ii<maxhtrsused;ii++)
       {
            kk = htrset[daypart][timerstate][ii];
            pwrset = heatscale[kk];
```

FIG. 11

```
/*
modify setpoint for line voltage <- this routine uses the calculated modifier
(linepowermult) to adjust the heater setting (pwrset) read from memory for each heater

*/

          if(st == holding)
          {
            iivar = (unit)(pwrset);
            iivar *= 100;
            if(linepwrmult)
              iivar /= linepwrmult;
            else
              iivar /= 100;

/*  <- this section looks at the modified power setting for a heater from above and
compares it to its 'counter' to determine on/off
*/

            if(!(jj & HTRSETOFF))
            {
              if(((uchar)iivar) >= powercnt[ii])
                jj |= HTRON;
            }
          }
        }
```

FIG. 12

CONTROLLER FOR A FOOD HOLDING OVEN

FIELD OF THE INVENTION

This invention relates to the field of food preparation. More particularly, this invention relates to a controller for a food holding oven that maintains pre-cooked foods in a ready-to-serve condition.

DESCRIPTION OF RELATED ART

In many restaurants, some food items are cooked in advance of when they are ordered by or served to a customer. Examples of such food items can include sandwiches and sandwich fillings like cooked eggs, hamburger patties, chicken nuggets or French fries. Such previously cooked food items are often maintained in a ready-to-use or ready-to-serve condition until they are served to the customer. This typically involves maintaining the previously cooked food items at a serving temperature in the range of from about 145 degrees F. to about 200 degrees F., depending on the food item.

Various food warming devices have been developed to maintain previously cooked food items at a desired serving temperature and are sometimes referred to as staging cabinets, holding cabinets, warming cabinets and food holding or food warming ovens. One challenge associated with food warming ovens is being able to preserve the flavor, appearance, and texture of previously-cooked food items while the items are being maintained at a desired serving temperature such that when a food item is served to or purchased by a customer, the customer will be pleased with the condition of the food item.

Fried foods in particular tend to become soggy when they are kept warm for extended periods of time. A commonly used method of warming fried foods is to heat them with infrared because it provides a relatively dry heat that can also be applied quickly.

Regardless of how heat is supplied to pre-cooked foods, it is believed to be well-known that pre-cooked foods that are kept warm in a holding oven will remain palatable for only a finite amount of time. The time that a pre-cooked food remains palatable, however, will vary based on the amount and duration of various warming heats supplied to a particular food item. Experimentation shows that the length of time that a pre-cooked food will remain palatable will depend on how the pre-cooked food item is kept warm. Other experimentation shows that the palatability of various foods will vary based on how warming heat is applied to the pre-cooked food item. A controller for heating pre-cooked food that will optimize the food's palatability over time would be an improvement over the prior art.

BRIEF DESCRIPTION OF THE DRAWINGS

FIGS. 11 and 12 contain the source code of a program by which the "on" time percentage is varied according to line voltage fluctuations.

DETAILED DESCRIPTION

Figure 1:
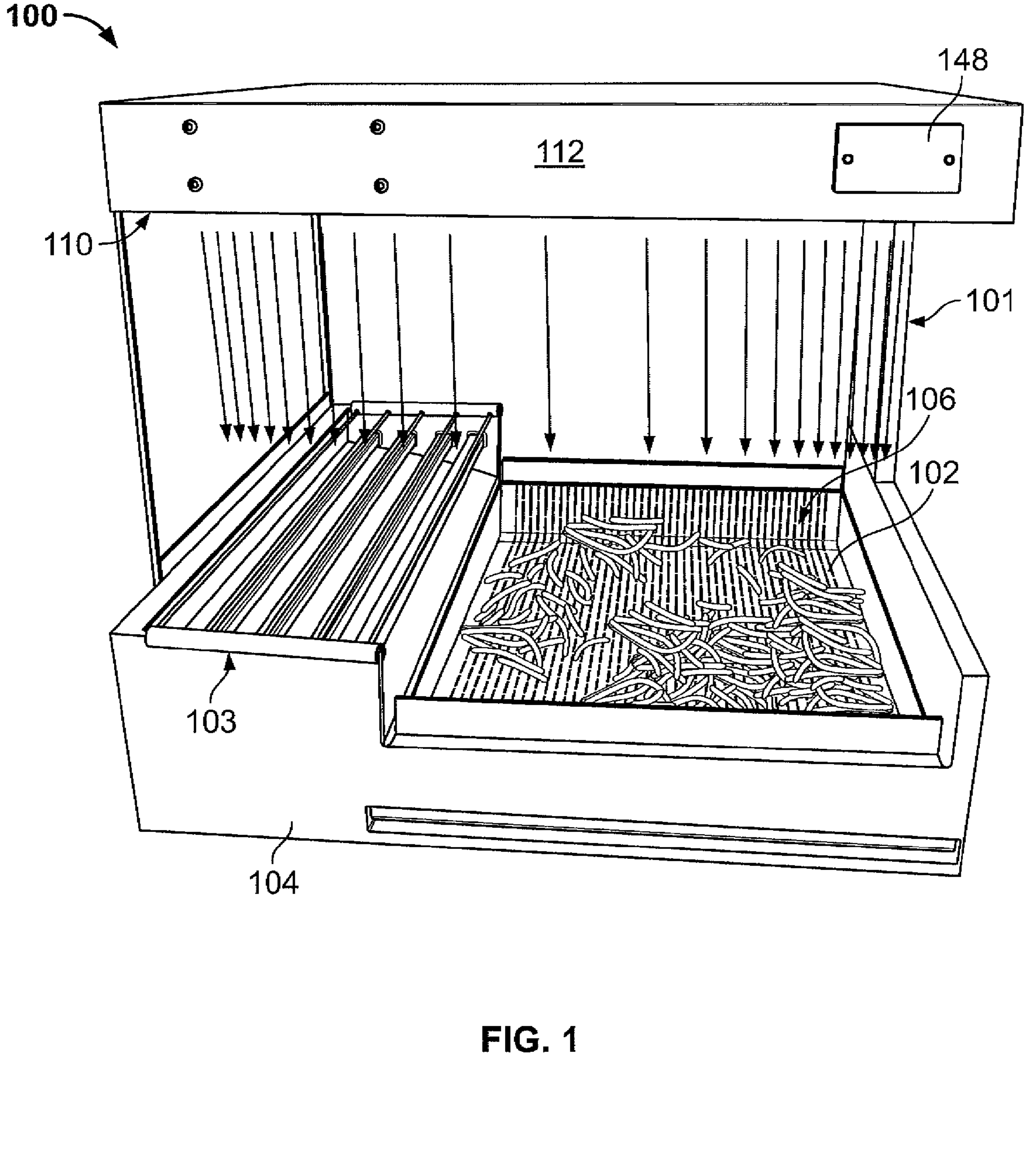
FIG. 1 depicts a front view of a food holding oven that heats or warms pre-cooked foods using infrared energy.
Figure 2:
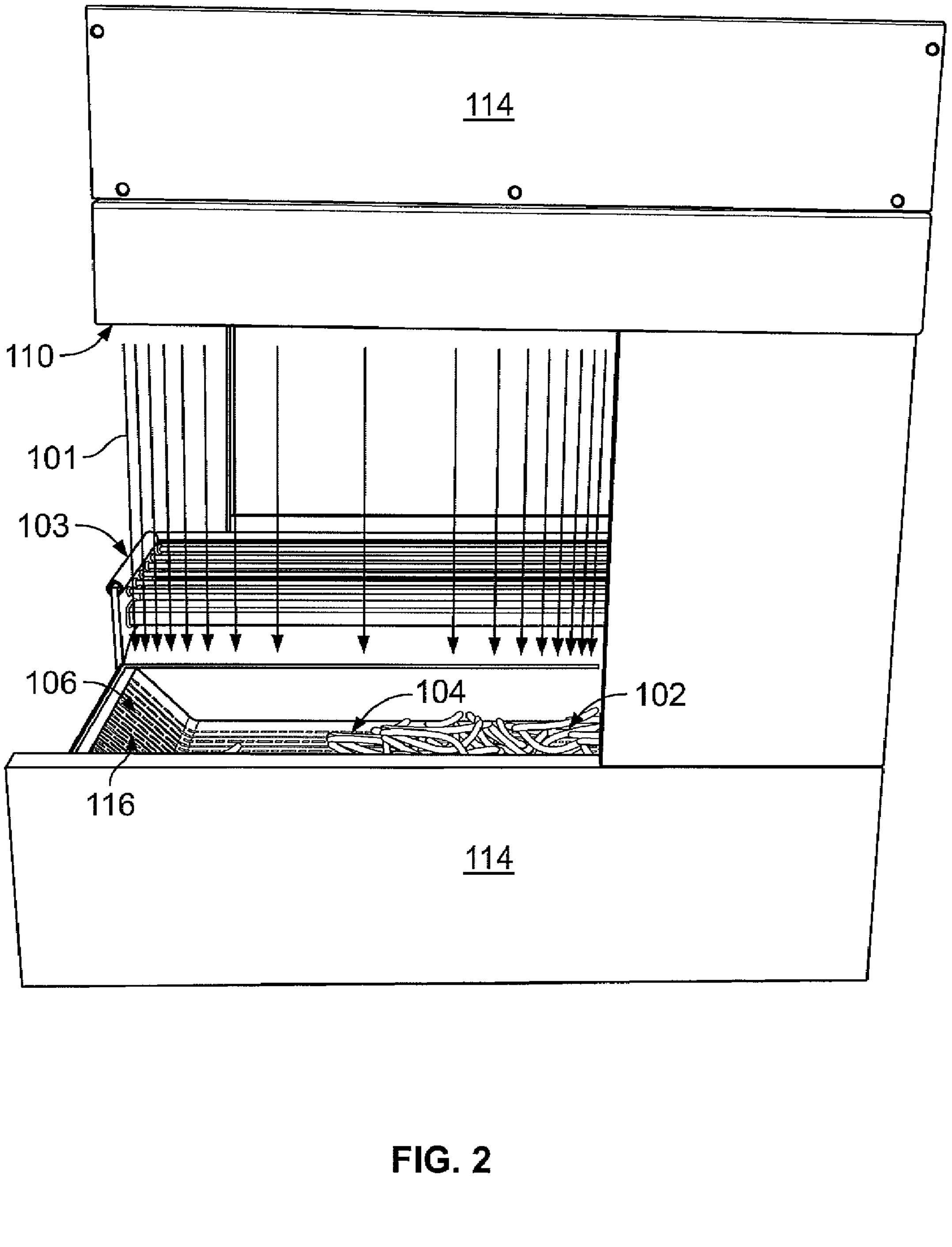
FIG. 2 depicts a side view of the oven shown in FIG. 1.

FIG. 1 shows a front view of a food holding 100 oven that can be used to warm previously cooked foods such as French fries, burgers, eggs, sandwiches and other foods, at selected temperatures until served. FIG. 2 is a right side view of the food holding oven 100 shown in FIG. 1.

As can be seen in both FIG. 1 and FIG. 2, the food holding oven 100 includes a holding tray 102 and a food rack 103 that are beneath an IR heater element 110 and which both rest atop a base cabinet 104. The cabinet's height and width (not shown) is selected to support the tray 102 at height whereat restaurant personnel can access food kept in the tray 102 and the rack 103, both of which are collectively referred to hereafter as a food holding tray 102. The heater 110 is not shown in FIG. 1 or FIG. 2 because it is located behind the front trim panel 112 in FIG. 1 and the side trim panel 114 in FIG. 3, however, the heater 110 directs infrared energy downwardly toward the food holding tray 102 and previously-cooked foods kept therein.

Figure 3:
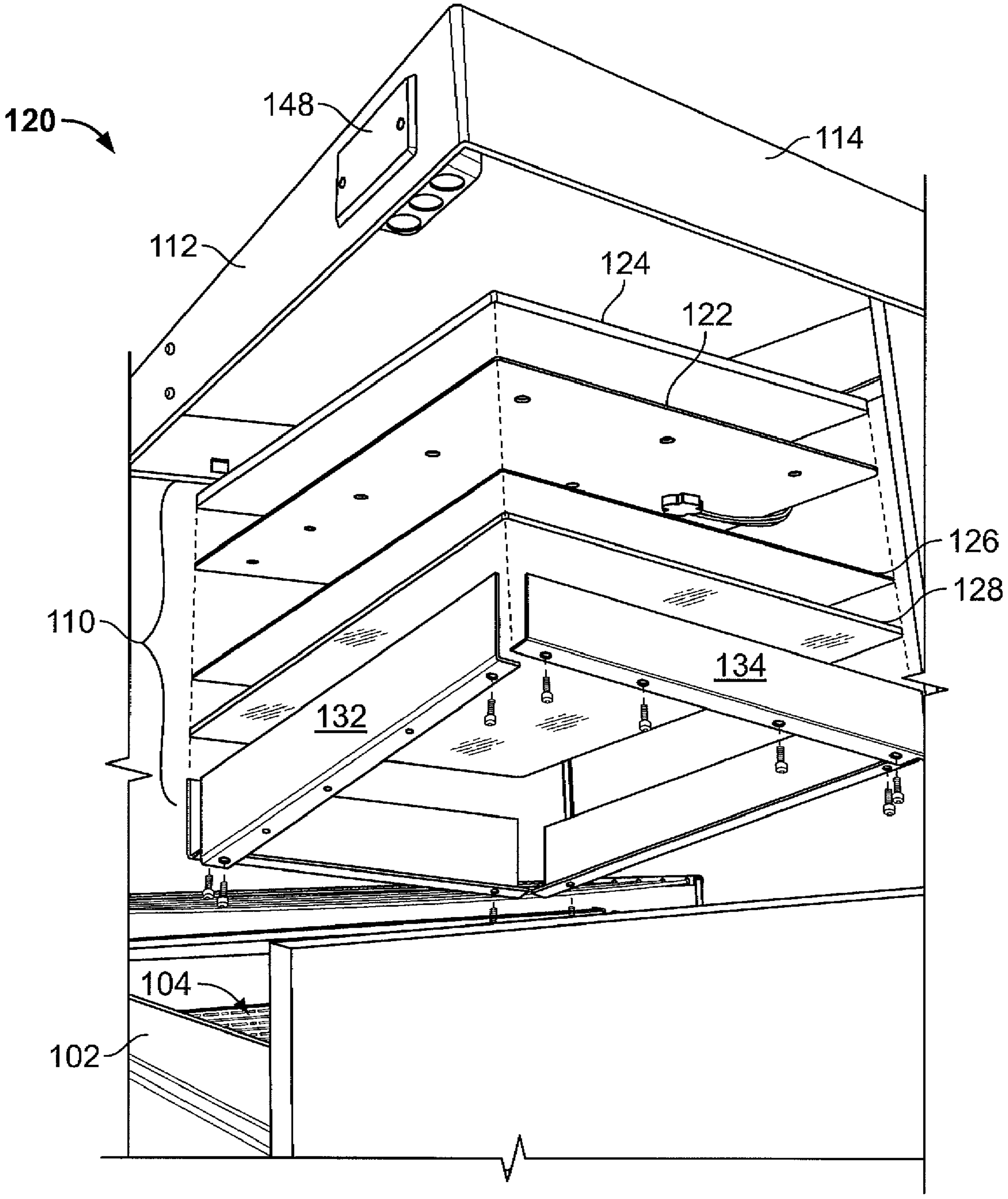
FIG. 3 depicts an exploded view of the food holding oven shown in FIG. 2 and FIG. 3 and depicts the infrared heating source used therein.

FIG. 3 shows the underside of the food holding oven hood and reveals the structure, location and attachment of a planar infrared heater 110 for the oven 100 depicted in FIG. 1 and FIG. 2. The planar heater 110 is mounted above the tray 102 and is substantially parallel to the planar bottom 104 of the tray 102 and spaced above the bottom 14 of the tray 102 by a predetermined distance of about fourteen to twenty four inches.

As stated above, experimentation shows that the palatability of a pre-cooked food is directly related to how a pre-cooked food item is kept warm after its preparation. Experimentation also shows that different types of foods require different amounts of heat over different amounts of time to maximize the time that a particular food item will remain palatable after cooking. By way of example, the palatability of pre-cooked French-fries is believed to be optimally maintained if after cooking they are supplied with a relatively small amount warming heat for the first one to two minutes after frying. During the next four minutes, the heat provided to French fries is double the initial amount of heat. During the following five minutes, the heat provided to the fries is triple the initial amount of heat. Nine to ten minutes after being cooked, the heat supplied to French fries is reduced to the initial level. Approximately 12 minutes after being cooked, the palatability of French fries will have deteriorated significantly, at which point many restaurants discard them rather than risk customer dissatisfaction with the product. The palatability of other foods, like burgers, sandwiches and desserts can be optimized using other, different warming profiles. Regardless of the food being kept warm, warming heat should needs to be carefully controlled to maximize a pre-cooked food's holding time and its palatability during the time that it is being kept warm.

Figure 4:
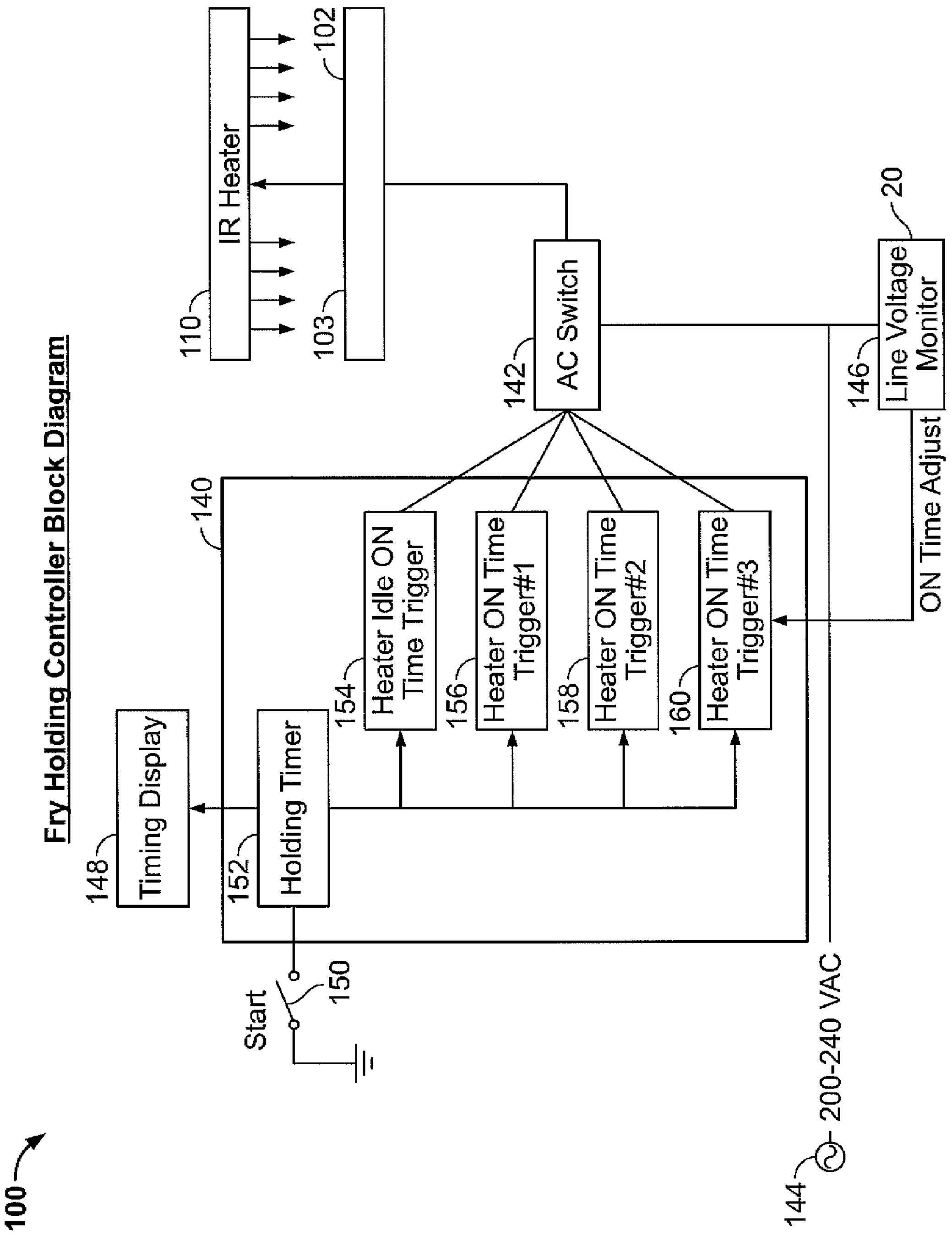
FIG. 4 is a block diagram of the functional elements of the controller for the food holding oven depicted in FIG. 1 and FIG. 2.

FIG. 4 is a block diagram of the functional elements of the food holding oven 100 for warming pre-cooked food items. A key element of the oven 100 is the controller 140, which is operatively coupled to and controls an electrical switch 142. The A.C. switch controls when and for how long, electrical energy from an A.C. voltage source 144 is applied to an infrared heater 110, the IR output of which is used to warm pre-cooked foods held in the warming tray 106. Since the A.C. switch 142 is coupled between the A.C. source 144 and the IR heater 110, and since the controller 140 is coupled to the A.C. switch 142, the controller 140 is considered to be coupled to the A.C. switch but the controller 140 is also considered to be coupled to the IR heater 110 in order for the controller 140 to effectuate its control.

In a preferred embodiment, the controller 140 is embodied as either a microprocessor or microcontroller coupled a memory device that stores executable instructions. When the instructions are executed, they enable the controller 140 to open and close the A.C. switch 142 to thereby control the amount of heat energy emitted from the heater 110 and the time during which a particular amount of heat energy is being emitted, based on a type of food to be kept warm in the warming tray 102.

Since the electrical energy for the IR heater 110 is usually A.C., the switch 142 is preferably embodied as either back-to-back silicon controlled rectifiers (SCRs) (not shown but well known to those of ordinary skill) or one or more TRIACs, (also not shown but well known to those of ordinary skill) the operating characteristics and specifications of which are a design choice but which are of course selected to be compatible with the current requirements of the IR heater 110, as those of ordinary skill in the art will recognize. An alternate but less reliable A.C. switch can of course be embodied as a relay.

As depicted by the functional blocks shown in FIG. 4, the controller 140 implements different timers, which are identified by reference numerals 152, 154, 156, 158 and 160. As the timers are implemented in the controller 140 and as their implementation is explained below, the timers determine both the amount or level of heat energy delivered to the IR heater 110 as well as the amount of time that a particular amount or level of heat energy is provided to the IR heater during a particular time interval.

Since pre-cooked foods can be kept warm for a finite length of time. the holding timer 152 defines a maximum length of time that a particular pre-cooked food item should be kept in the warming oven 100. The holding timer 152 is thus initialized and started by the actuation of the start button 150. The start button 150 is thus normally actuated when a pre-cooked food item is placed into the tray 102 of the warming oven 100.

In one embodiment, display 148 displays the holding time remaining on the holding timer 150 before a pre-cooked food item should be discarded. In an alternate embodiment, display 148 displays the time elapsed since the start button 150 was last actuated. In either embodiment, the display 148 acts to notify an operator as to when to consider disposing of food items that have been kept warm in the oven.

In the preferred embodiment, the food holding tray 102 is kept at an idle or waiting temperature. In an alternate embodiment the time during which the food holding tray 102 is kept an idle or waiting temperature can be limited by the idle heat timer 154, at the expiration of which power to the infrared heater is cut off. The idle heat therefore define a quiescent state during which the A.C. power supplied to the IR heater 110 is kept at a relatively low, stand-by level in order to keep the food warming tray 102 relatively warm.

Figure 5:
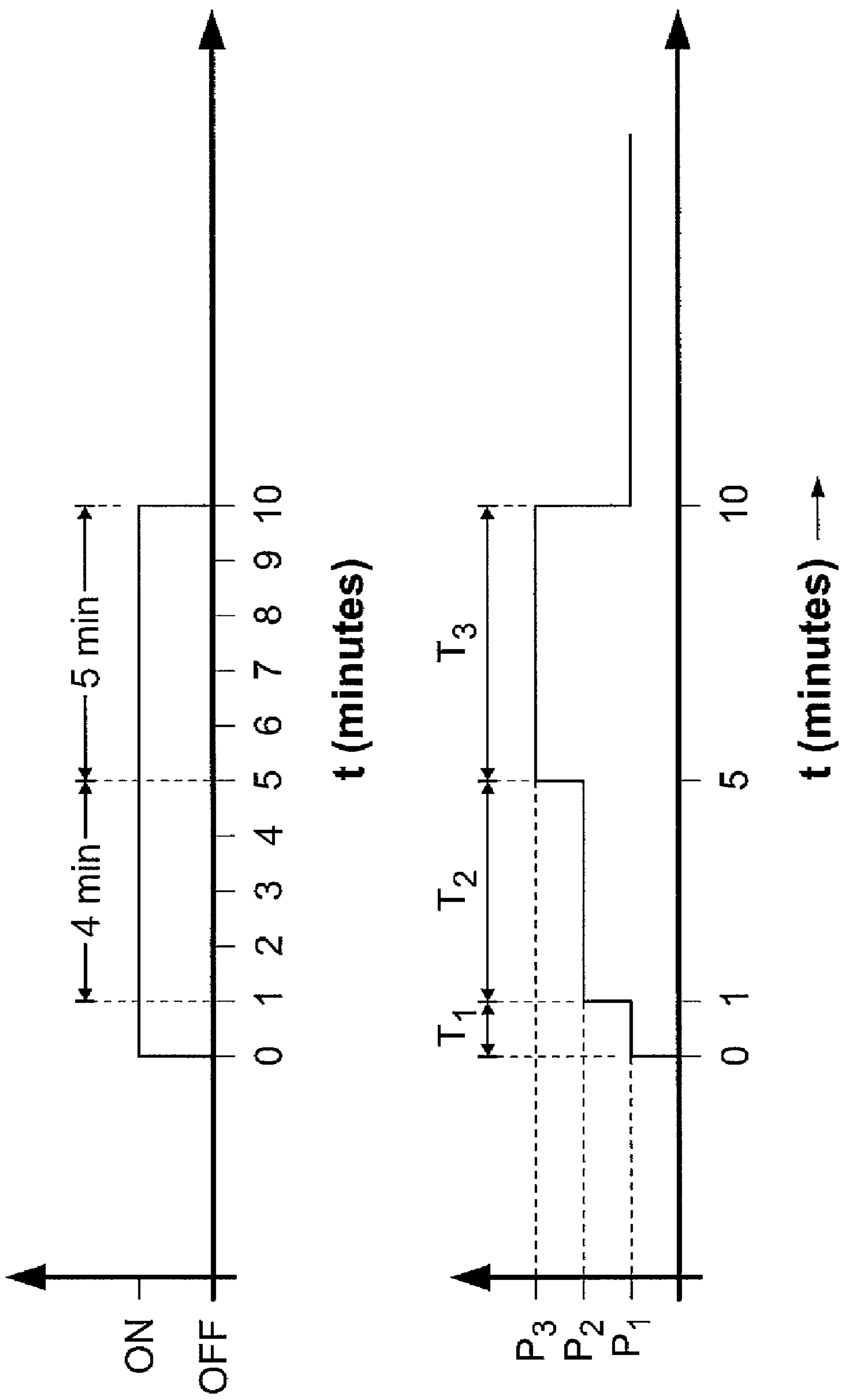
FIG. 5 is a plot of infrared heater output power as a function of time for warming French fries in the oven depicted in FIG. 1 and FIG. 2.

A "first" timer identified by reference numeral 156 is denominated in FIG. 4 as the heater "on time trigger no. 1." The first timer 156 defines a first time period T1 during which a "first" amount of energy denoted as P1 in FIG. 5 is supplied to the IR heater 110 through the control of the A.C. switch on-time duty cycle.

A "second" timer identified by reference numeral 158 defines a second time period T2 that begins at the termination of the first time period T1. T2 is usually different from T1, however, T2 can be greater than, less than or equal to T1 based on the heating requirements of the food item to be kept warm. The second timer 158 determines a second amount of energy P2 that is delivered during T2, and which is usually greater than P1 but which can also be less than or equal to the P1 energy level.

A third timer 160 defines a third time period T3, which begins at the termination of the second time period T2. The third timer 160 also determines a third and an amount of energy, P3, which is usually different from the second amount P2 that is supplied to the IR heater 110 while the second timer 158 is running and which can be also different from the energy P1 supplied during T1.

The amount of energy P1, P2 and P3, supplied to the IR heater 110 during any one of the aforementioned and corresponding time periods T1, T2 and T3 is effectuated by cycling the A.C. switch on and off, which cycles A.C. line voltage to the IR heater 110 on and off. Cycling the A.C. switch on and off will of course cause the heat that is output from the infrared heater 110 to vary up and down accordingly, however, the thermal mass of the infrared heater 110 components and the thermal mass of other components of the oven effectively smooth or average-out the energy being output from the heater 110. Cycling the A.C. line voltage to the IR heater 110 therefore effectively controls the average input power that is provided to the IR heater over time, which in turn effectively determines the average energy output from the heater 110 over time.

As used herein, the A.C. switch 142 "on" time is considered to be the time during which A.C. line voltage is supplied to the IR heater 110 from an A.C. line source 144. The A.C. switch 142 "off" time is considered to be the time during A.C. line voltage is disconnected from the IR heater 110.

The "on" time of the A.C. switch is determined relative to a fixed length time window, $T_w$, during a portion of which the A.C. switch is closed or "on." By controlling the A.C. switch 142 "on" time over a fixed-length window, $T_w$, the power output from the IR heater 110 can be controlled without using relatively expensive devices and circuitry that would be required to change the output power by controlling the duty cycle or phase of the A.C. line voltage supplied to the heater 110. In other words, by controlling the A.C. switch 142 "on" time, IR heater 110 output power is adjusted using a relatively low-cost A.C. switch, implemented using low-cost but highly reliable SCRs or TRIACS, the "on" time of which is rapidly cycled over a fixed-length time window to average the power deliver to the heater during the time window.

Well-known prior art A.C. controllers effectuate A.C. power control by turning on a semiconductor device such as an SCR or TRIAC at different points of an A.C. voltage waveform. The methodology used in such prior art A.C. power control devices can be described or referred to as either phase control or duty cycle control in the sense that the A.C. controlling semiconductor is turned "on" (or is put into a conductive state) for only fractional portions of the duty cycle or period of an A.C. line voltage.

The invention disclosed and claimed herein does not control the infrared heater output power by controlling either the duty cycle, phase or phase angle of the A.C. line voltage that is provided to the infrared heater. Stated another way, $T_w$ is not be less than the period of the A.C. line voltage frequency but will be much greater than the time of an A.C. line voltage period, which is well-known to be 1/f, where f is the nominal line voltage frequency. For a 60 Hertz line voltage the A.C. line voltage signal period, 1/f will be $1/60^{th}$ of a second.

In the invention that is described and claimed herein, the A.C. full line voltage is applied to the infrared heater whenever the A.C. switch closes. The percentage of time that the full line voltage is applied over the time window $T_w$ determines the average A.C. power, over the time windows, $T_w$. As set forth herein, in a preferred embodiment, $T_w$ is about 12 seconds, however, $T_w$ could also be one second, five seconds, fifteen seconds or longer, so long as the "on" time and "off" time durations do not cause significantly noticeable temperature swings in the tray.

Referring now to FIG. 5 there is shown a plot of IR heater 110 output power as a function of time. The plot shown in FIG. 5 depicts how the energy from the heater 110 should be applied to optimize the palatability of French fries after frying.

During a first time period T1 that extends from zero through one (1) minute, the output power is at a first level denominated as P1. During a second time period T2, which is depicted as being four minutes in length and which begins at the termination of T1, the heater 110 output power increases to, and stays at a higher level denominated as P2. During a third time period T3, which is depicted as being five minutes in length and which begins at the termination of T2, the heater 110 output power increases to, and stays at a higher level denominated as P3. At the termination of T3, the heater 110 output power falls back to P1 where it stays. The cycle depicted in FIG. 5 is ten minutes, which is considered to be nearly the maximum amount of time the French fries should be kept after frying, which is also the duration of holding timer 152. Alternate embodiments can of course provide shorter and/or longer durations for each of T1, T2 and T3.

The IR heater 110 output power levels P1, P2, and P3 depicted in FIG. 5 are representative of the fact that the output power of the heater 110 is changed during the time intervals T1, T2, T3, etc., the durations of which are represented by corresponding timer values 154, 156, 158, 160. In a preferred embodiment used to warm French fries, the first power level P1 during T1 is approximately twenty percent (20%) of the IR heater 110 maximum output. The second power level P2 applied during T2 is approximately fifty percent (50%) of the IR heater's maximum output. P3, which is applied during T3, is approximately seventy percent (70%) of the heater's maximum output. Alternate embodiments of the controller 140 can of course provide more time intervals or fewer time intervals based on the type of food to be kept warm. Alternate embodiments can also provide power output levels that are different from those described above.

The heater 110 output power level is changed during each timer interval by controlling the A.C. switch 142 "on" time relative to its "off" time during a fixed-length time "window" denoted in the figures as $T_w$. In a preferred embodiment, $T_w$ was ten (10) seconds and several consecutive ten (10) second $T_w$ intervals make up the time that is specified by the timers 154, 156, 158 and 160. The A.C. line voltage "on" time can therefore be expressed as a percentage of the "on" time and "off" time during each $T_w$, with the sum of the "on" time and "off" time being to $T_w$, which is a total of ten seconds. Alternate embodiments can also include time "windows" of $T_w$ that are shorter than ten seconds as well as greater than ten seconds.

Figure 6:
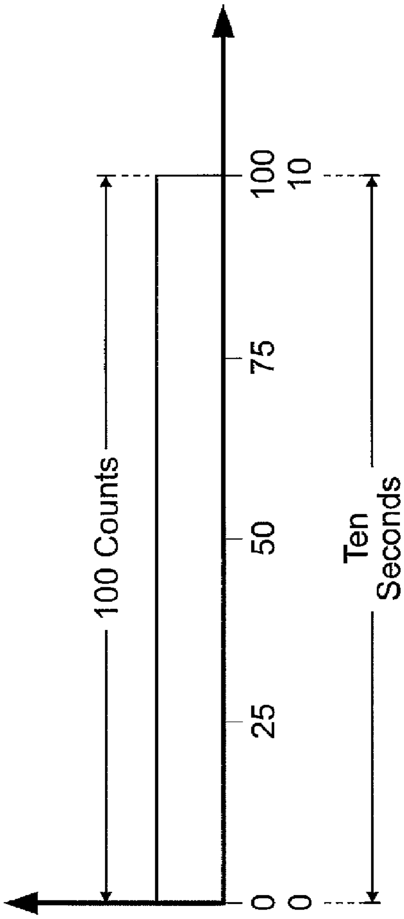
FIG. 6 depicts a fixed-duration ten second window divided into 100 sub-interval time periods.

For purposes of illustrating different $T_w$ windows, FIG. 6 depicts a ten second frame or time "window" $T_w$. The subdivision of the ten second window into one hundred (100) equal-length sub-intervals defines one-hundred, one-tenth of a second counts that can be made during the ten-second duration window, $T_w$.

The IR heater's "on" time percentage during each ten-second window $T_w$ is determined by the controller implementing a one-tenth second clock, one hundred counts of which effectively subdivide a ten-second window $T_w$ into one hundred (100) equal, one-tenth second parts. A ten second window $T_w$ is thus defined by and divided into one hundred equal parts by the use of a clock generated in software by the controller 140 or perhaps by external timer device, which is not shown in the figures for clarity but well-known to those or ordinary skill in the art. Regardless of whether the one-tenth second clock is implemented in software or hardware, since one-tenth of a second is one count, one hundred counts equals ten seconds. Counting up (or counting down) a number of one-tenth second clock cycles therefore corresponds to the percentage of time that electrical power is applied to the IR heater during the ten second window time, $T_w$.

By dividing up successive fixed-duration time windows into 100-count sub-intervals, the relative power output from the infrared heater 110 is controlled to be a percentage of its full output power, e.g., 20%, 50%, 77%, simply by counting (up or down) the one-tenth second sub-intervals. Fractional output power control is therefore simply effectuated by having he controller 140 turn the A.C. switch "on" for a corresponding number of sub-intervals during consecutive ten second windows, a multiple number of which determine the length of the timers 154, 156, 158 and 160 depicted in FIG. 4.

Figure 7:
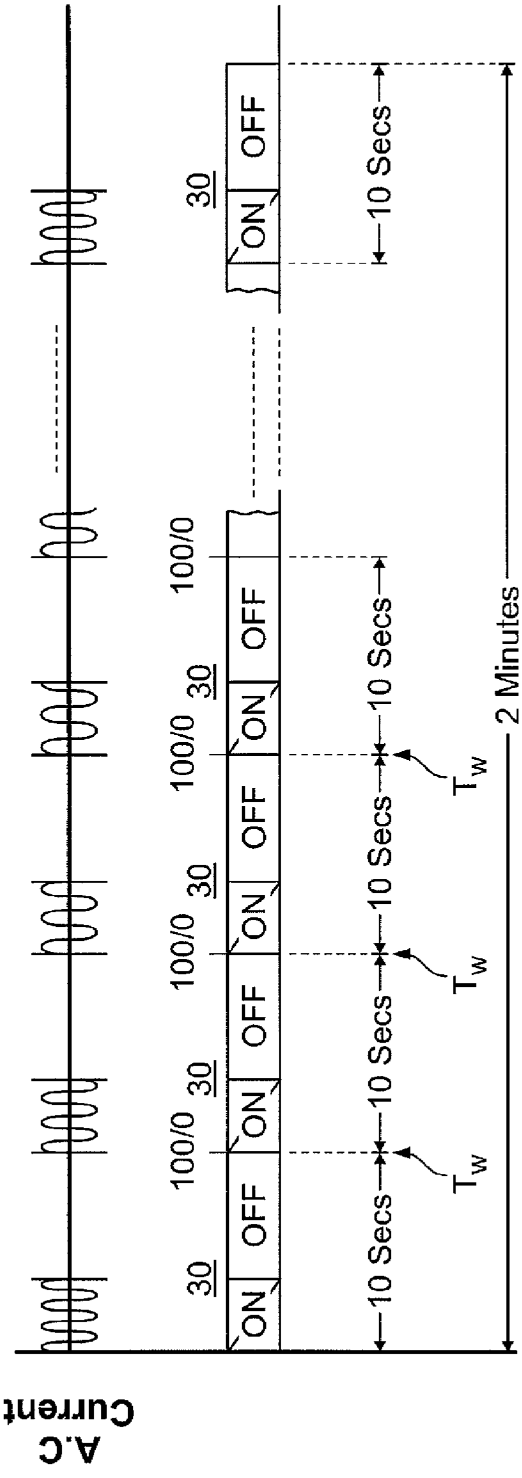
FIG. 7 illustrates how several consecutive fixed-duration ten-second windows are temporally concatenated and the A.C. voltage "on" time during each window is controlled in order to effectuate an average output power from an infrared heater.
Figure 8:
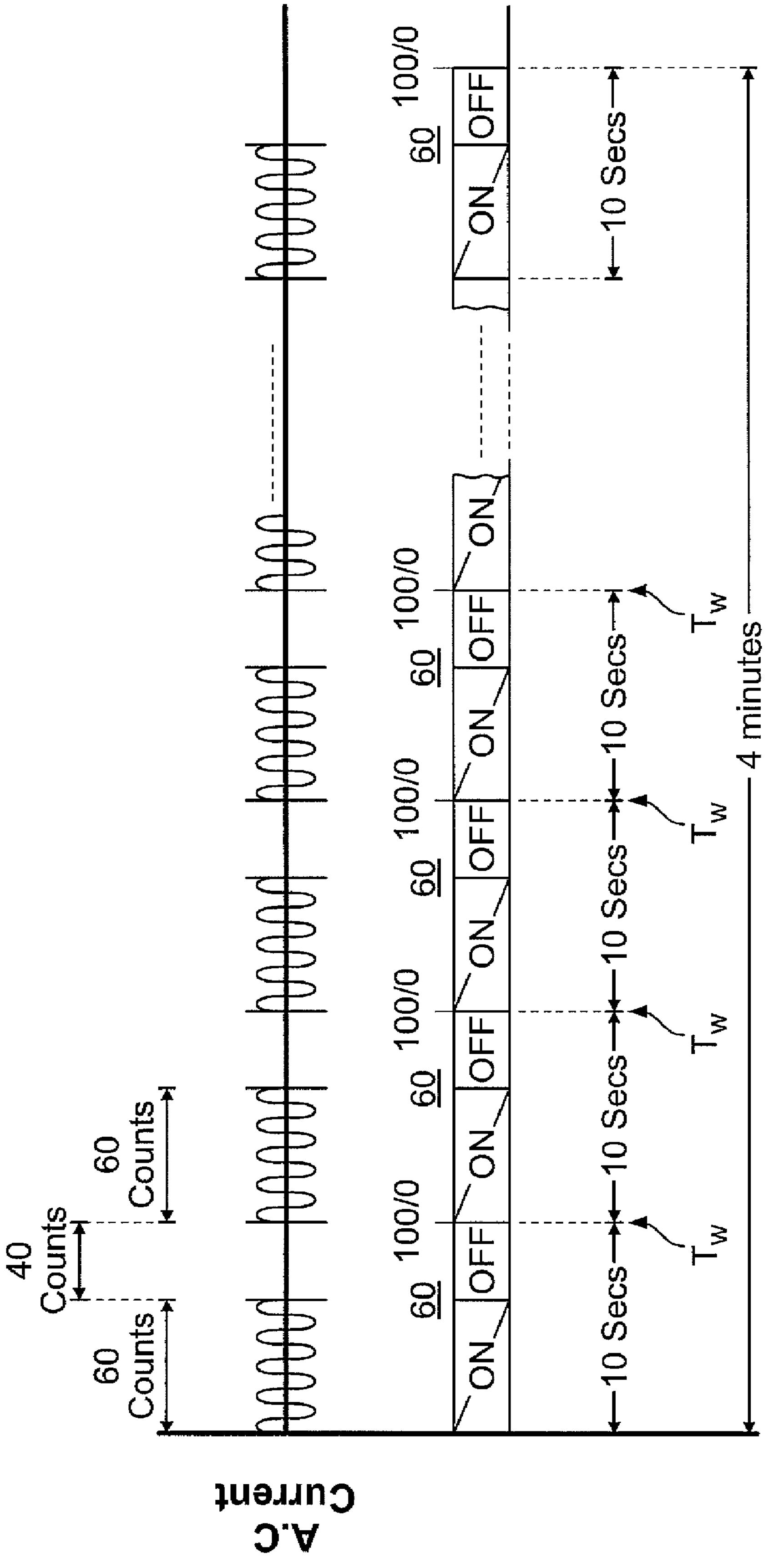
FIG. 8 illustrates another example of how several consecutive fixed-duration ten-second windows are temporally concatenated and the A.C. voltage "on" time during each window is controlled in order to effectuate a different average output power from an infrared heater.
Figure 9:
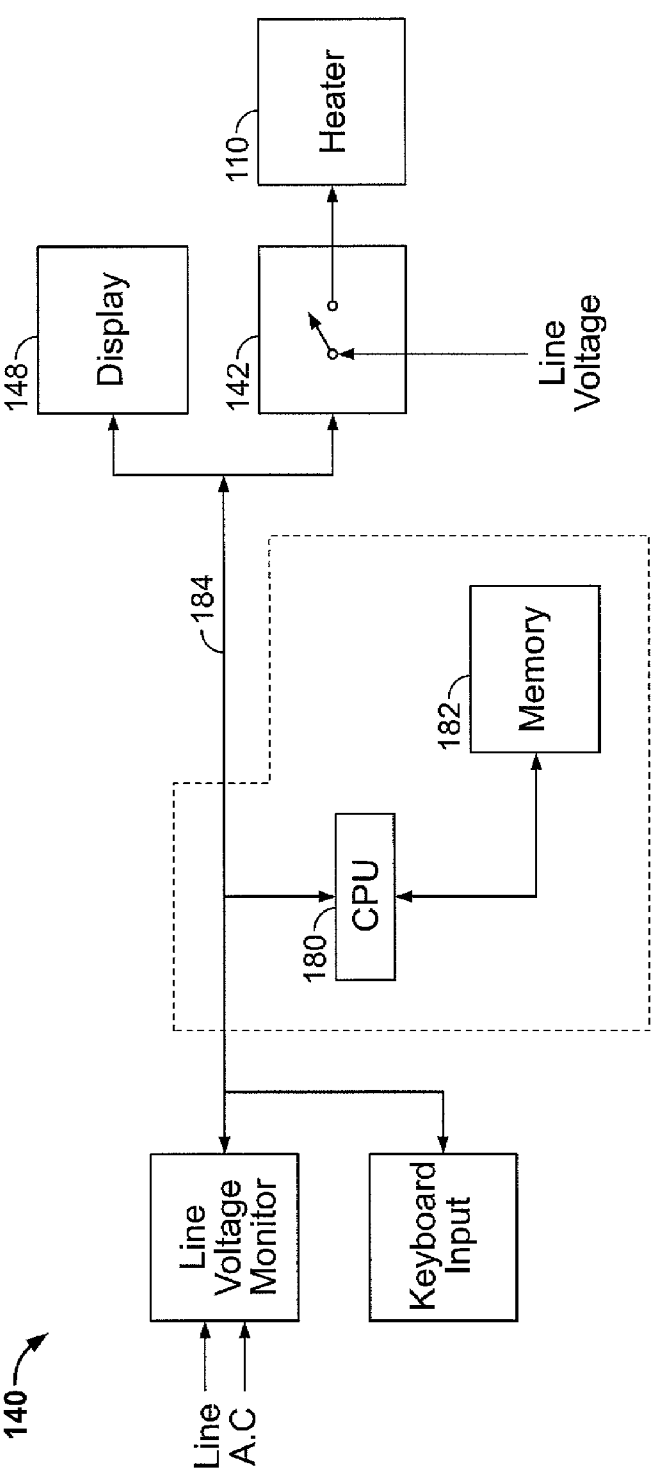
FIG. 9 is a block diagram of the functional elements that comprise the processor portion of the controller 140 depicted in FIG. 4.

By way of example and with regard to FIGS. 7 and 8, the infrared heater 110 output power can be set at thirty percent (30%) by turning the A.C. heater 110 on at the start of an initial ten-second window and thereafter counting thirty (30) consecutive one-tenth second clock cycles of the one-hundred (100) such clock cycles that are in a ten (10) second window. When the $30^{th}$, one-tenth second clock is counted, the A.C. heater is shut off for seventy consecutive one-tenth second clock cycles, since the sum of thirty, one-tenth second clock cycles and seventy one-tenth second clock cycles is equal to one hundred, one-tenth second cycles, or ten seconds. After 70, (seventy) one-tenth second clock cycles are counted, the A.C. power to the heater 110 is restored for another thirty cycles, and so on.

Even though the A.C. power to the infrared heater 110 is kept on for relatively long periods of time, vis-à-vis the A.C. power line frequency, the output power of the infrared heater 110 is effectively controlled due to the fact that the thermal mass of the components of the oven 100 and the thermal mass of the heater 110 itself require time to change. In other words, the components of the infrared heater 110 and the oven 110 effectively preclude rapid temperature changes.

Referring now to FIG. 7 there is shown a timing diagram of the A.C. switch 142 "on" time, during a two-minute portion of the T2 time interval shown in FIG. 5. In FIG. 7, the average output power level of the infrared heater 110 is thirty percent (30%) of its maximum output power, at least over the two-minute interval depicted in FIG. 7.

In FIG. 7, the several fixed-duration, consecutive ten-second windows or time intervals, are denominated as $T_w$. The controller 140 turns on the A.C. switch 142 under software control at the start of each time interval $T_w$, as shown by the sinusoidal waveform at the top of FIG. 7. The controller 140 keeps the A.C. power applied to the heater 110 until thirty (30) of the one hundred, one-tenth second intervals have been counted by the controller 140, at which time the A.C. power is shut off by the controller 140. Over a long period of time, the A.C. power to the infrared heater 110 is thus kept on thirty percent of the time, which effectively limits the heater output power to thirty percent of its maximum value.

FIG. 8 is another timing diagram of the A.C. switch 142 "on" time, during the four-minute T2 time interval shown in FIG. 5. In FIG. 8, the average output power of the infrared heater 110 is sixty percent (60%) of its maximum output power.

At the start of each time interval, the controller 140 turns on the A.C. switch, as depicted by the sinusoidal waveform at the top of FIG. 8. The controller 140 keeps the A.C. power to the heater 110 on until sixty (60) counts have elapsed, at which time the A.C. power is shut off. Over the four minute T2 time interval, the A.C. power to the infrared heater 110 is kept on, sixty percent of the time effectively controlling the heater output power to sixty percent of its maximum value.

The controller 140 controls "on" time, "off" time and the display of the holding time through a central processing unit (CPU) 180 and the program instructions and data that it reads from an associated memory device 182, which is coupled to the CPU through a data/address/control bus 184. When the program instructions stored in the memory device 182 are executed by the CPU 180, the instructions imbue the controller 140 with the functionality described above, specifically including the "on" time and "off" time of the A.C. switch 142 during time intervals, T1, T2, T3, etc. by which heat input to foods in the oven 100 can be controlled to prolong the palatability of the food after cooking.

In addition to the memory device 182, the CPU 180 is also coupled to a time display 148, which is also depicted in FIG. 1 and FIG. 4. In a preferred embodiment, the timer display 148 displays the holding timer 152 value as either an elapsed time or a time-remaining value. The display of the holding time for a food item kept in the warming oven 100 can enable a restaurant owner to adjust production of a food item being kept warm in the oven 100.

Those of ordinary skill in the electrical art will appreciate that A.C. line voltages are not consistent through-out the United States nor are they consistent in any given area. Within the United States, nominal A.C. line voltages can range between 203 and 230 volts, however, those nominal A.C. line voltages are known to fluctuate depending on transmission capacity and nearby usage.

Since the output power Pout of the IR heater 110 is equal to square of the line voltage divided by the heater resistance ($P=V_{line}^2/R_{heater}$) the output power of the infrared heater 110 will decrease as line voltage decreases. In order to more accurately control heating of pre-cooked foods, the controller 140 includes a line voltage monitor 142, which continuously samples the A.C. line voltage and provides a digital representation of the line voltage by the controller can adjust the count values used to control IR heater 110 output power levels.

Figure 10:
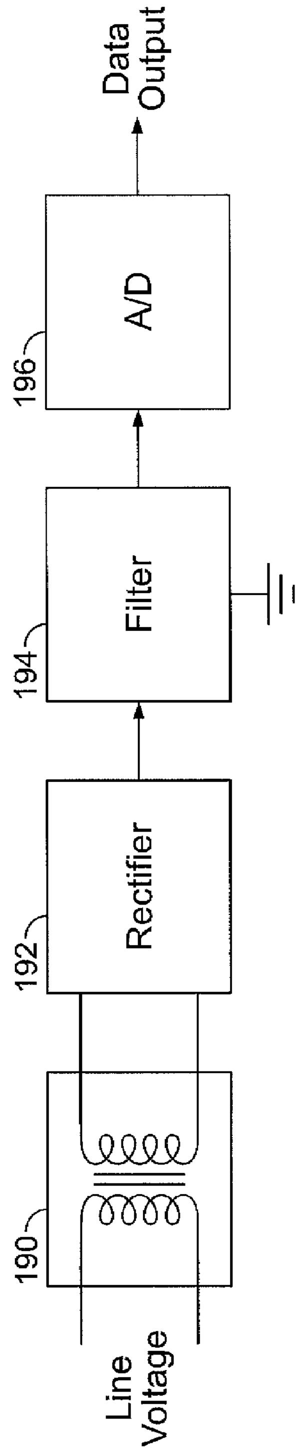
FIG. 10 is a block diagram of an A.C. voltage line voltage sensor.

FIG. 10 is a block diagram of a line voltage monitor 142. A step-down transformer 190 reduces the incoming line voltage to a value that can be accurately read by an analog-to-digital converter (A/D) after the output of the transformer 190 is rectified by rectifier 192 and low pass filtered by a simple low pass filter 194. The rectifier 192 can be either a half-wave, full-wave or bridge rectifier, subject to the limitation that after filtering, the corresponding D.C. value of the stepped-down A.C. line voltage can be accurately converted by the A/D to a digital value. The output of the line voltage monitor 146 is read by the controller 140 and used to adjust the percentage of time that the A.C. switch is closed in order to compensate for line voltage variations and the variations in IR heater output power that line voltage variations cause.

Digital data output from the A/D converter 196 is read by the CPU and correlated with A.C. line voltages that a particular IR heater element 110 is designed to operate at to output a particular heat output power level. An "on" time correction, which is the amount of time by which to increase or decrease "on" time necessary to provide a certain power output is arithmetically determined using the algorithm depicted in FIGS. 11 and 12, which contain C programming language instructions to adjust the A.C. switch 142 "on" time according to line voltage fluctuations.

Referring now to FIG. 11 and FIG. 12, which is source code of program instructions that modify the count values to adjust for line voltage fluctuations, and which those of ordinary skill in the C programming language will readily understand. In FIG. 11, a D.C. voltage proportional to and representative of the actual A.C. line voltage is read (in real time) by the statement, iivar=runAD(LSENAD). The following instruction averages the value stored in iivar with a previously-read value that was copied into "linerefavg" and "normalized" to range of between 100 and 130 regardless of what the actual A.C. line voltage range might be.

In FIG. 12, the instructions for a 100-130 volt counter correction include a statement that is, "linepwrmult=(uchar)(iivar/10)." It and the "for" loop that follows "linepwrmult" fetch a heater "percentage" setting described above and place the heater output percentage into "pwrset." If the program is in a temperature "holding" state, the current power setting percentage is modified with a with the newly-calculated value in "linepwrmult" to produce a resultant that is compared to the counter value in "powercnt{ii] to see if the heater should be on or off.

As set forth above, experimentation shows that the time that a pre-cooked food can be kept palatable can be maximized if the heat used to warm a particular food is controlled as to its intensity and its duration. Experimentation also shows that different foods are best kept ready to serve using different warming heats over different times. By carefully controlling the amount of heat provided to a pre-cooked food and controlling the amount or intensity of the heat provided to various pre-cooked foods over time, the over-all time that a pre-cooked food can be kept optimally palatable can be extended over what the prior art provides. The foregoing description of the food warming oven is provided for purposes of illustration. The true scope of the invention is defined by the appurtenant claims.

What is claimed is:

1. An apparatus for heating pre-cooked food products, said apparatus comprising:

an electrically powered infrared heater;

a controller, operatively coupled to an electrical energy source and to the infrared heater, the controller controlling the electrical power to the infrared heater during at least three successive time periods, wherein:

during a first time period, a first amount of electrical energy is provided to the infrared heater to output a first amount of infrared energy;

during a second time period that begins after a termination of the first time period, a second amount of electrical energy is provided to the infrared heater to generate a second amount of infrared energy that is greater than the amount of infrared energy provided in the first time period;

during a third time period that begins after a termination of the second time period, a third amount of electrical energy is provided to the infrared heater to generate a third amount of infrared energy that is greater than the amount of infrared energy provided in a second time period; and, at termination of the third time period, a fourth amount of electrical energy is provided to the infrared heater;

wherein the duration of each of the first, second and third time periods is a different duration and each of said first, second and third amounts of infrared energy are different, the durations of the first, second and third time periods and the first, second and third amounts being selected according to a type of food to be warmed, and wherein the fourth amount of electrical energy is less than the second amount of electrical energy.

2. The apparatus of claim 1, wherein the electrical energy source is an A.C. line voltage and the full line voltage is provided to the infrared heater for a fractional amount of a time period.

3. The apparatus of claim 1, wherein:

the first period is substantially equal to one minute;

the second period is substantially equal to four minutes; and the third period is substantially equal to five minutes.

4. The apparatus of claim 1, wherein:

the first amount of infrared energy is approximately twenty percent of the infrared heater's maximum output power level;

the second amount of infrared energy is approximately fifty percent; and the third amount of infrared energy is approximately seventy percent of the infrared heater's maximum output power level.

5. The apparatus of claim 1, further comprised of a line voltage sensor, operatively coupled to the controller, information from the line voltage sensor causing the controller to adjust the length of at least one time period to maintain the corresponding amount of infrared energy emitted during the at least one time period with line voltage fluctuations.

6. The apparatus of claim 5, wherein said line voltage sensor is comprised of a transformer having an input coupled to the line voltage and an output coupled to an analog-to-digital (A/D) converter, the A/D converter producing an output signal representative of the line voltage input to the infrared heater.

7. The apparatus of claim 1, wherein the infrared heater has a maximum output power level and wherein the first, second and third amounts of energy are determined by applying electrical energy to the infrared heater for corresponding fractional portions of a fixed-length time period during which electrical energy is provided to said infrared heater.

8. The apparatus of claim 7, wherein said controller is configured to include a timer-counter having a maximum count value of N to divide the fixed-length time period into N-equal length sub-intervals, an M/N fractional portion of the fixed-length time period being determined by the time-counter counting M of the N, sub-intervals.

9. The apparatus of claim 7, wherein the fixed-length time period is substantially equal to ten seconds and wherein the first, second and third amounts of electrical energy correspond to first, second and third percentages of said ten second interval during which electrical energy is provided to said infrared heater.

10. The apparatus of claim 7 wherein the fixed-length time period is substantially equal to ten seconds and wherein N is equal to 100 to thereby divide the ten second time period into 100 equal sub-intervals.

11. An apparatus for heating pre-cooked food products, said apparatus comprising:

an electrically powered infrared heater;

an electrical switch having an input coupled to an electrical energy source, an output coupled to the infrared heater and a control input;

a line voltage sensor, operatively coupled to said electrical energy source;

a controller, operatively coupled to the switch control input, and the line voltage sensor, the controller controlling the switch to control electrical energy to the infrared heater such that:

during a first time period, electrical energy is provided to the infrared heater to output a first amount of infrared energy;

during a second time period that begins after a termination of the first length of time, electrical energy is provided to the infrared heater to output a second amount of infrared energy that is greater than the amount of infrared energy provided in the first period;

during a third time period that begins after a termination of the second time period electrical energy is provided to the infrared heater to output a third amount of infrared energy that is greater than the amount of infrared energy provided in the second period;

and, at termination of the third time period, a fourth, non-zero amount of electrical energy is provided to the infrared heater;

wherein the duration of each of the first, second and third time periods is a different duration and each of said first, second and third amounts of infrared energy are different, the durations of the first, second and third time periods and the first, second and third amounts being selected according to a type of food to be warmed, and wherein the fourth amount of electrical energy is less than the second amount of electrical energy.

12. The apparatus of claim 11, wherein the switch is comprised of a triac.

13. The apparatus of claim 11, wherein the switch is comprised of a silicon controlled rectifier.

14. The apparatus of claim 11, wherein the switch is a mechanical relay.

15. The apparatus of claim 11, wherein the line voltage sensor is comprised of:

a step-down transformer having an input coupled to the line voltage;

a rectifier; and an analog-to-digital converter producing a digital output signal that represents the line voltage input to the step-down transformer, said digital output being read by the controller, said controller increasing at least one of the first, second and third time periods when said line voltage falls and decreasing at least one of the first, second and third time periods when said line voltage rises.

16. A method of heating a previously-cooked food product, said method comprising the steps of:

heating the food product with different amounts of infrared energy generated from an electrically-powered infrared heater that is operatively coupled to an A.C. line voltage, such that:

during a first time period, infrared energy at a first power level is directed toward the food product;

during a second time period that begins after the first time period, infrared energy at a second power level is directed toward the food product, the second power level being greater than the first power level;

during a third time period that begins after the second time period, infrared energy at a third power level is directed toward the food product, the third power level being greater than the second power level;

at the termination of the third time period, thereafter directing infrared energy toward the food product at a fourth, non-zero power level that is less than the second power level.

17. The method of claim 16, wherein the fourth power level is substantially equal to the first power level.

18. The method of claim 16, wherein the line voltage is monitored by a line voltage monitor, an output signal of which is used to adjust at least one of the first, second and third time periods such that a time period is increased when said line voltage drops and a time period is decreased when said line voltage increases.

19. The method of claim 16, wherein the first, second and third time periods and the first, second and third power levels are different for different types of foods.

20. The method of claim 16, wherein:

the first time period is substantially equal to one minute;

the second time period is substantially equal to four minutes; and the third time period is substantially equal to five minutes.

* * * * *